United States Patent
Jaeger

(10) Patent No.: US 10,352,564 B2
(45) Date of Patent: Jul. 16, 2019

(54) LIQUID GAS SYSTEM

(71) Applicant: TRUMA GERAETETECHNIK GMBH & CO. KG, Putzbrunn (DE)

(72) Inventor: Markus Jaeger, Hoehenkirchen-Siegertsbrunn (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 247 days.

(21) Appl. No.: 15/647,417

(22) Filed: Jul. 12, 2017

(65) Prior Publication Data

US 2018/0017256 A1    Jan. 18, 2018

(30) Foreign Application Priority Data

Jul. 13, 2016   (DE) .......................... 10 2016 112 888

(51) Int. Cl.
| | |
|---|---|
| *F23N 5/24* | (2006.01) |
| *F23N 5/20* | (2006.01) |
| *B01D 25/00* | (2006.01) |
| *B01D 27/00* | (2006.01) |

(Continued)

(52) U.S. Cl.
CPC ............. *F23N 5/203* (2013.01); *B01D 25/00* (2013.01); *B01D 27/00* (2013.01); *F17C 13/00* (2013.01); *F17C 13/081* (2013.01); *F23N 5/242* (2013.01); *F17C 2205/0142* (2013.01); *F17C 2205/0341* (2013.01); *F17C 2205/058* (2013.01); *F17C 2221/035* (2013.01); *F17C 2270/0518* (2013.01); *F17C 2270/0709* (2013.01); *F23N 2027/10* (2013.01)

(58) Field of Classification Search
CPC ......... B01D 25/00; B01D 27/00; F17C 13/00; F17C 13/081; F17C 2205/0142; F17C 2205/0341; F17C 2205/058; F17C 2221/035; F17C 2270/0518; F17C 2270/0709; F23N 5/203; F23N 5/242; F23N 2027/10
USPC ....................................... 261/129, 130, 135
See application file for complete search history.

(56) References Cited

U.S. PATENT DOCUMENTS

| | | | | |
|---|---|---|---|---|
| 3,955,186 | A | * 5/1976 | Green et al. ......... | G01N 27/122 137/78.4 |
| 4,223,692 | A | * 9/1980 | Perry ...................... | F16K 17/30 137/460 |

(Continued)

FOREIGN PATENT DOCUMENTS

| | | |
|---|---|---|
| DE | 82 25 049 U1 | 1/1983 |
| DE | 8815256 U1 | 1/1989 |

(Continued)

*Primary Examiner* — Charles S Bushey
(74) *Attorney, Agent, or Firm* — McNees Wallace & Nurick LLC

(57) ABSTRACT

A liquid gas system for mobile applications includes at least one remote gas switch that is mountable to a bottle of liquid gas and a gas pressure regulator. The high-pressure input of the gas pressure regulator is connected to the remote gas switch. A distribution block is provided, the input of which is connected to the low-pressure output of the gas pressure regulator. A filter unit is arranged between the low-pressure output of the gas pressure regulator and the distribution block. Further, an electronic controller is provided which is connected to the remote gas switch.

23 Claims, 2 Drawing Sheets

(51) Int. Cl.
  *F17C 13/00* (2006.01)
  *F17C 13/08* (2006.01)

(56) References Cited

U.S. PATENT DOCUMENTS

| | | | | |
|---|---|---|---|---|
| 4,916,437 | A * | 4/1990 | Gazzaz | F17D 5/02 |
| | | | | 251/129.01 |
| 5,287,873 | A | 2/1994 | Venet | |
| 5,548,962 | A | 8/1996 | Luger et al. | |
| 6,708,718 | B2 * | 3/2004 | Yamada | F16K 1/305 |
| | | | | 137/255 |
| 7,600,536 | B1 * | 10/2009 | Steininger | F16L 41/03 |
| | | | | 137/882 |
| 2004/0035480 | A1 | 2/2004 | Tsourides | |
| 2006/0231144 | A1 | 10/2006 | Schwan et al. | |
| 2013/0190897 | A1 | 7/2013 | Junk et al. | |
| 2014/0150884 | A1 | 6/2014 | Cramer | |
| 2016/0172164 | A1 * | 6/2016 | Sweeney | H01J 37/3171 |
| | | | | 250/429 |
| 2016/0178085 | A1 | 6/2016 | Williams et al. | |

FOREIGN PATENT DOCUMENTS

| | | |
|---|---|---|
| DE | 40 12 122 A1 | 10/1991 |
| DE | 297 19 364 U1 | 5/1998 |
| DE | 10 2005 040 024 A1 | 3/2007 |
| DE | 10 2008 058 995 A1 | 6/2010 |
| DE | 20 2011 110 687 U1 | 9/2015 |
| DE | 10 2014 103 238 A1 | 10/2015 |
| EP | 1 199 449 B1 | 4/2002 |
| EP | 1760390 A2 | 3/2007 |
| EP | 3 006 812 A1 | 4/2016 |
| FR | 2898964 A1 | 9/2007 |
| WO | 2006/136409 A1 | 12/2006 |

\* cited by examiner

LIQUID GAS SYSTEM

The present invention relates to a liquid gas system for mobile applications, for example for a camper, a caravan, a motorboat etc.

BACKGROUND OF THE INVENTION

By means of a liquid gas system, gas-operated electric consumers may be operated, for example a gas cooker or gas heating.

Regarding the different requirements for such a liquid gas system, a large number of different components are required, which have to be accommodated in adequate positions. When the liquid gas system comprises two bottles of gas which are switched automatically, an automatic switch is used, which in case of pressure decrease in the bottle currently providing the gas (i.e., the operating gas bottle) switches to a second bottle (standby gas bottle).

In case the gas heating or the gas supply system is to be operated while the camper is travelling, an apparatus is required that shuts off the gas supply at a damage of a gas line due to an accident. For example, this may be performed by a crash sensor which automatically cuts off the gas supply after a certain delay time has been exceeded. Further filters and separators are used to remove oil-containing aerosols from the gas flow, thus the function of the gas processor regulator will not be impacted.

The objective of the invention is to provide a liquid gas system which needs less installation space and provides a higher ease of use to a user.

BRIEF DESCRIPTION OF THE INVENTION

In order to achieve this object according to the invention a liquid gas system for mobile applications is provided comprising at least one solenoid valve (also known as remote gas switch) which is mountable to a bottle of liquid gas, a gas pressure regulator, where the high-pressure side thereof is connected to the solenoid valve, a distribution block, where the input thereof is connected to the low-pressure output of the gas regulator, a filter unit arranged between the low-pressure output of the gas pressure regulator and the distribution block, and an electronic controller, which is connected to the solenoid valve. Said liquid gas system is characterized by the fact that less different components are required for connecting a bottle of liquid gas (or two bottles of liquid gas for a system comprising two bottles of liquid gas). By using solenoid valves as remote gas switches an automatic switch may be eliminated, which normally also has to be mounted in the bottle box for the bottles of liquid gas. Further, space is freed in the bottle box by eliminating any filters on the high-pressure side of the liquid gas system.

A distinctive feature of the liquid gas system according to the invention is that no special arrangements have to be made on the high-pressure side in order to protect the gas system against contaminations (for example, by oil-containing aerosols), which may enter the liquid gas system together with the liquid gas. In the state of the art filter and separators are used upstream of the gas regulator in order to prevent these contaminations from reaching the gas pressure regulator, or at least the gas pressure tubes to the gas pressure regulator have to be routed in a continuously rising way in order to ensure that as few contaminations as possible will reach the gas pressure regulator. According to the invention, contaminations will be only filtered or separated on the low-pressure side. Thus, the space in the bottle box will not be reduced further.

According to an embodiment of the invention, it is intended that the filter unit contains a disposable filter. It may easily be exchanged by the user, if required, thus the performance of the filter may be restored with little effort.

The disposable filter may be a filter cartridge, for example, which is inserted by a user in a suitable reception unit without directly contacting any separated substances.

According to a preferred embodiment of the invention, a sensor detecting the contamination of the disposable filter is provided. This allows the user to determine the remaining filtering capacity of the filter without having to check the filter itself.

The contamination sensor may contain a RFID-chip, for example, which is integrated with the disposable filter. This allows to retrieve the degree of contamination in a contact-free way.

In one embodiment, the contamination sensor may be connected to the controller of the liquid gas system. The controller may display the remaining capacity of the filter to a user. Based on the increase in contamination of the filter so far, the controller may also project when a new filter cartridge has to be inserted. In addition, the controller may alert the user to buy a replacement filter cartridge in time. It may further be conceived that the controller automatically triggers a reorder.

According to a preferred embodiment of the invention, the filter unit is integrated in the distribution block. Thus, the filter unit needs not to be mounted separately. Moreover, the distribution block is normally mounted in a position being at least fairly accessible, thus the filter unit is accessible too.

Here, a distribution block denotes a combination of several quick-closing valves which act as cut off valve for individual gas devices.

Preferably, a second high-pressure tube is connected to the high-pressure side of the liquid gas system, which leads to a second solenoid valve, which acts as a remote gas switch. This enables it to connect a second bottle of pressure gas, thus the system always contains an operating bottle and a standby bottle.

The two high-pressure tubes are preferably coupled to the both inputs of a tee-piece, the output of which is coupled to the high-pressure input of the gas pressure regulator. This results in a simple mechanical design of the liquid gas system.

An electronic crash sensor may be provided in the liquid gas system which is connected to the controller. The crash sensor enables to operate the liquid gas system even when the vehicle is travelling. In case of an accident, the crash sensor is triggered, thus the controller cuts off the two remote gas switches. Hereby safety is ensured.

In an alternative embodiment, an interface may be provided by means of which the liquid gas system may "tap" the signal of the crash sensor integrated with the vehicle, which is equipped with the liquid gas system. Thus, no separate crash sensor has to be provided for the liquid gas system.

According to an embodiment, a heating element and a sensor are provided on the low-pressure side of the liquid gas system. By means of these two components a leak test of the liquid gas system may be performed with comparatively little effort. Thus, the heating element is activated in a state where no gas is consumed by any electric consumer. After switching off the heating element, a characteristic parameter may be monitored by means of the sensor, in particular, in the course of the temperature over time, when the sensor is a temperature sensor. Said characteristic parameter behaves differently for a closed liquid gas system as compared to a liquid gas system containing a leak.

In case the sensor is a temperature sensor, cooling curves are stored in the controller, and the controller compares a measured cooling curve with the stored cooling curves. In case the liquid gas system is leaking and thus gas is flowing from the liquid gas bottle into the system, after switching off the heating element the temperature will decrease faster as this is the case for a closed liquid gas system.

It may also be provided that the surrounding temperature of the liquid gas system is taken into account during comparison of the cooling curve.

According to a preferred embodiment of the invention, a gas level measurement device is provided. The gas level measurement device is preferably mounted directly to the bottle of liquid gas, for example on the bottom thereof, thus the user is always able to retrieve the filling level of the respective bottle of liquid gas.

Preferably, the gas level measurement device is connected to the controller. This enables the controller to switch automatically from an operating bottle of liquid gas to a standby bottle of liquid gas, in case the volume of the operating bottle of liquid gas is used up. The controller may also display to the user just in time that the stock volume of the operating bottle of liquid gas will soon be used up, and it has been switched to the standby bottle of liquid gas, thus the user is able to buy a new bottle of liquid gas and connect it in time. The controller may calculate a projection for the user how long it will take to use up the stock volume of the liquid gas, provided that the gas consumption will continue to remain on the current level.

According to an embodiment of the invention, a heating apparatus is provided at the gas pressure regulator, which is connected to the controller. By means of the heating apparatus an icing-up of the gas pressure regulator may be prevented. This is particularly important for camping in winter.

Preferably, the heating apparatus is associated to a temperature sensor, which is connected to the controller. This enables to switch on the heating apparatus automatically in case the outer temperature falls under a certain threshold.

According to an embodiment of the invention the controller comprises a near field communications interface, for example, according to the Bluetooth or WLAN standard. This enables a user to control the liquid gas system by using her/his smartphone, and to retrieve the values relevant for her/him, for example the liquid gas stock volume. In addition, the user may trigger a leak test.

Preferably, the controller also comprises a remote communications interface by means of which an SMS may be sent, for example. This way, a user may be informed about certain things, for example in case the liquid gas system falls under a certain threshold, even she/he is not near to the liquid gas system.

According to an embodiment it is provided that a remote gas switch is connected directly to the input of the gas pressure regulator. In this embodiment, no high-pressure tube is required.

According to an embodiment, the remote gas switch is connected directly to the input of the gas pressure regulator by means of the high-pressure tube. This results in a higher flexibility for arranging the gas pressure regulator.

In case a high-pressure tube is used, it may be provided with a tube break protector in order to enhance operating safety.

For a liquid gas system comprising two bottles of gas, one of the gas bottles may also be directly connected to the gas pressure regulator and the other by means of the high-pressure tube. In each case a remote gas switch (a solenoid valve) is used on every bottle of gas in order to be able to shut-off the bottle of gas in a reliable and fast way, if required.

BRIEF DESCRIPTION OF THE DRAWINGS

The invention is described in the following by using different exemplary embodiments which are explained in the appended drawings. In the figures.

DETAILED DESCRIPTION OF THE INVENTION

Figure 1:
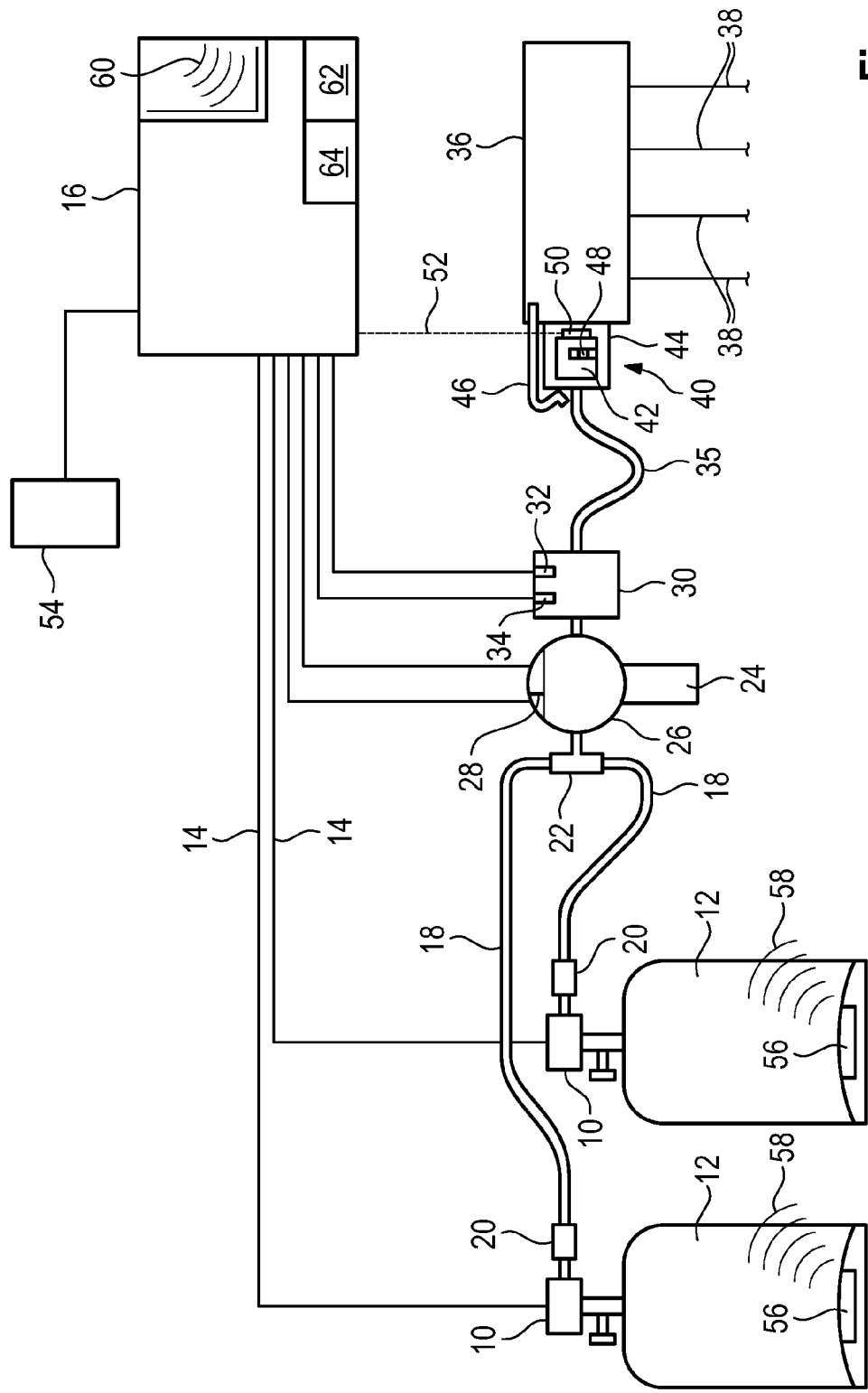
FIG. 1 shows schematically a liquid gas system according to a first embodiment of the invention.

The liquid gas system comprises two remote gas switches 10 to which a bottle of liquid gas 12 is connected, respectively. Liquid gas bottles are pressure containers filled with pressurized liquid petrol gas (LPG), for example with propane and butane. These are common bottles of liquid gas (in most cases bottles of propane/butane gas), which a user may carry and exchange.

The remote gas switches 10 are solenoid valves which are closed in a currentless state. In order to open them, a solenoid (not shown here) has to be energized. This is performed by the schematically shown control lines 14 which are coupled to a controller 16.

The output of the remote gas switch 10 is connected to a high-pressure tube 18, respectively, which is provided with a tube break protector 20. The tube break protector 20 works mechanically and ensures to prevent any leakage of gas, in case the escaping gas volume exceeds a predefined volume throughput (due to a leakage).

The two high-pressure tubes 18 are coupled to both inputs of a tee-piece 22, the output of which is coupled to the high-pressure input of a gas pressure regulator 24.

The gas pressure regulator 24 reduces the pressure on the high-pressure side of the liquid gas system, this is the pressure of the bottle, to the significantly lower pressure of the low-pressure side, for example to 30 mbar.

It has shown that common gas pressure regulators which are used in an up-to-date gas system comprising a well-maintained bottle of gas are sufficiently protected against eventually occurring contaminations.

A heating device 26 is associated with the gas pressure regulator 24, which may be driven by the controller 16. In addition, a temperature sensor 28 is provided, which is also connected to the controller 16.

On the low-pressure side of the gas pressure regulator 24 a leak test unit 30 is provided directly next to the gas pressure regulator, which comprises a heating element 32 and a sensor 34. In the exemplary embodiment shown, the sensor is a temperature sensor.

Both the heating element 32 and the sensor 34 are connected to the controller 16.

The gas is routed from the leak test unit 30 via the low-pressure line 35 to a distribution block 36, to which the respective electric consumers are coupled via lines 38 which may be shut-off separately, for example a gas cooker, a burner of a heating system, a burner of a refrigerator, etc. A filter unit 40 is integrated with the distribution block 36 which serves to retain contaminations before the gas is forwarded to the electric consumers. In particular, the contaminations may be oil-containing aerosols. In addition, a precipitator may be provided in order to precipitate moisture.

In the filter unit 40 a disposable filter is arranged in the form of a filter cartridge 42. The filter cartridge 42 is accommodated in a filter casing 44, which may be easily opened and closed again by a user (in particular with any tools). Here, to this end, a clamp mechanism 46 is indicated schematically, which similar to a quick-closing-connection automatically shuts-off the connection in case of a break.

An inspection window 48 is present on the side of the filter cartridge 42, thus a user is always able to check the remaining filtering capacity (or, in other words, up to which degree the filter cartridge is already depleted due to the retained contaminations).

Further, the filter cartridge 42 is provided with the contamination sensor 50, which may identify the degree of contamination of the filter and accordingly determine the remaining filtering capacity.

Also, a RFID chip (not shown here) is integrated in the contamination sensor, which may be driven by the controller 16. This is shown by the dashed communication line 52.

In addition, the liquid gas system has an electronic crash sensor 54 which is connected to the controller 16.

A filling level meter 56 is associated with each of the bottles of liquid gas 12 by means of which the filling level of the respective bottle of liquid gas 12 may be determined.

The filling level meters 56 preferably use ultrasound that is generated by a piezo-element and is coupled into the wall of the bottle of liquid gas 12. In the exemplary embodiment shown, the filling level meters 56 are arranged on the lower side of the bottles of liquid gas 12 at the bottom. Based on a measurement of the time the coupled ultrasound signals need to get reflected on the boundary surface in a liquid-gaseous mode and are again received by the piezo-element, the filling level of the respective bottle of liquid gas may be determined in a reliable way. Said filling level may be sent to the controller 16 or retrieved by it. This may be performed wireless by using a suitable communications protocol, for example the Bluetooth standard. The communication link is indicated here schematically with the reference number 58.

The controller 16 comprises a near field communications interface 60 which may support the Bluetooth and/or the WLAN standard, for example. By using the near field communications interface 60, the filling level meters 56 may be retrieved. In addition, they may be used to establish communication with the smartphone of a user, in case his/her a smartphone is located next to the controller 16.

The controller 16 further comprises a remote communications interface 62, which is adapted to communicate via a cellular network and/or an internet connection, for example by SMS, in case the user is not near to the controller 16.

By means of the controller 16 and the further components of the liquid gas system, it may be operated in a safe and uncomplicated way.

The remote gas switches 10 facilitate switching from one bottle of gas to another bottle of gas. This may be performed automatically by the controller, in case the filling level of the respective bottle of liquid gas 12, which currently operates the liquid gas system, falls under a certain value. The user may be informed in advance or at this point of time at the latest that the current standby bottle of liquid gas 12 is taking over the gas supply, and thus a new bottle of liquid gas 12 has to be bought.

Due to their design, the remote gas switches 10 also ensure that the two bottles of liquid gas 12 are removed from the system in case no electrical power is present, this is, for example, when the camper is temporarily taken off the road, and thus the battery is disconnected.

The heating device 26 prevents the icing up of the gas pressure regulator 24 even in case of low surrounding temperatures, and thus the liquid gas system may also be reliably operated in winter.

The leak test unit 30 enables a user to easily perform an automated leak test. For this purpose, the controller 16 drives the heating element 32 until a predefined temperature is achieved in the leak test unit 30. Then the cooling behavior is detected by the temperature sensor 34. The recorded cooling curve is compared with the cooling curves 60 stored in the controller 16. In case the liquid gas system is a closed system, the temperature will be reduced in a comparatively slow way. In case the liquid gas system is not tight, that is, the gas will flow from a bottle of liquid gas 12 into the system, then the temperature will here sink faster than in a closed liquid gas system. Accordingly, the controller 16 is able to detect that there is apparently a leakage. In this case the user may be adequately informed by the controller 16, and the controller 16 may switch off both bottles of liquid gas 12 by means of the two remote gas switches 10. The switching off will not be suspended until a service technician confirms that the gas system has been repaired. In this case the service technician would perform a leak test again. Hereto the controller 16 activates the remote gas switch and thus releases the gas system such that the measurement may start.

Due to the electric crash sensor 54 it is allowed to operate the liquid gas system also in a camper which is travelling. The controller 16 may directly cut off the gas supply by using the remote gas switches 10, in case the crash sensor 54 detects a delay indicating an accident.

By means of the filter unit 40 it may be ensured that the electric consumers are reliably protected against any contaminations present in the gas. By means of the contamination sensor associated with the filter cartridge 42, the user is able to determine the remaining many filtering capacity at any time, and when a new filter cartridge has to be inserted. Due to the distinctive design of the filter unit 40, it may be inserted without any tool and with little effort, thus after replacing the filter the system becomes immediately operable again.

Figure 2:
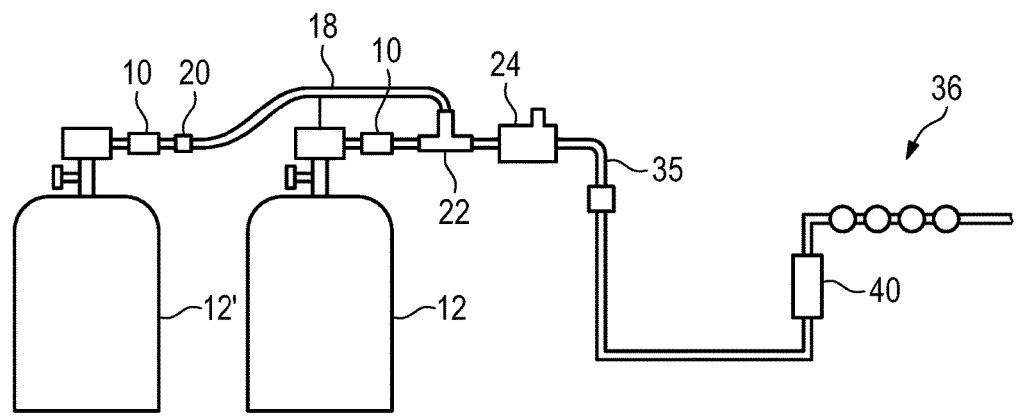
FIG. 2 shows schematically a liquid gas system according to a second embodiment of the invention.

FIG. 2 shows a liquid gas system according to a second embodiment. For components known from the first embodiment the same reference number will be used, and in this respect reference is made to the description above.

In the second embodiment, the first bottle of gas 12 is directly connected to the remote gas switch 10, to which the gas pressure regulator 24 is connected by using a tee-piece 22.

Downwards of the gas pressure regulator 24 a low-pressure line 35 is connected which is forwarded via a filter unit 40 to the distribution block 36.

The second gas bottle (here, for differentiation, the reference number 12' is used) is connected to the second input of the tee-piece 22 by means of a high-pressure tube 18, which comprises a tube break protector 20 and is connected to an output of a further remote gas switch 10. Also, at the second bottle of gas 12', the remote gas switch 10 is directly mounted to it, without the need of a tube connection between the bottle of gas 12' and the remote gas switch 10.

Depending on the respective safety requirements, the tube break protector may also not be required.

Generally, this results in a liquid gas system providing both a simple design and a high operational reliability.

The further components of the liquid gas system, like the controller etc., are not shown in FIG. 2.

Figure 3:
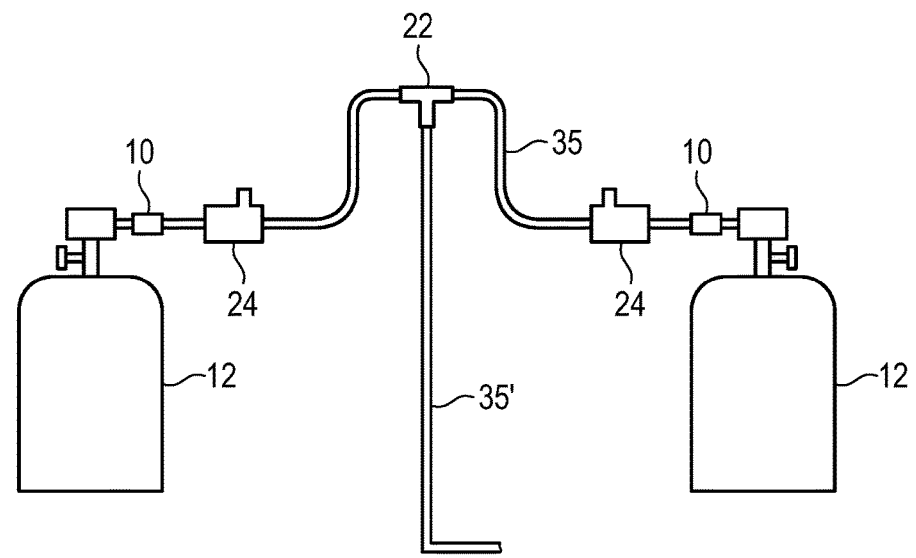
FIG. 3 shows schematically a liquid gas system according to a third embodiment of the invention.

FIG. 3 is a liquid gas system according to a third embodiment. For components known from the preceding embodiments the same reference number will be used, and thus reference is made to the description above.

In a third embodiment, a remote gas switch 10, which is followed by a gas pressure regulator 24, is attached to each bottle of gas 12. The outputs of the two gas pressure regulators 24 are connected to the two inputs of the tee-piece 22 via low-pressure tubes 35, from which a further low-pressure tube 35' is routed to a filter unit (not shown here) and then to the distribution block.

The advantage of the third embodiment is that no high-pressure tube is used.

The invention claimed is:

1. A liquid gas system for mobile applications comprising at least one remote gas switch that is mountable to a bottle of liquid gas, a gas pressure regulator, where the high-pressure input thereof is connected to the remote gas switch, a distribution block, where the input thereof is connected to the low-pressure output of the gas pressure regulator, a filter unit arranged between the low-pressure output of the gas pressure regulator and the distribution block, and an electronic controller which is connected to the remote gas switch.

2. The liquid gas system of claim 1 wherein the filter unit comprises a disposable filter.

3. The liquid gas system of claim 2 wherein the disposable filter is a filter cartridge.

4. The liquid gas system of claim 2 wherein a sensor for detecting the contamination of the disposable filter is provided.

5. The liquid gas system of claim 4 wherein the contamination sensor comprises a RFID chip which is integrated with the disposable filter.

6. The liquid gas system of claim 4 wherein the contamination sensor is connected to the controller.

7. The liquid gas system of claim 1 wherein the filter unit is integrated with the distribution block.

8. The liquid gas system of claim 1 wherein a second high-pressure tube leading to the second remote gas switch is connected on the high-pressure side of the liquid gas system.

9. The liquid gas system of claim 8 wherein the two high-pressure tubes are connected to both inputs of the tee-piece, where the output thereof is connected to the high-pressure input of the gas pressure regulator.

10. The liquid gas system of claim 1 wherein an electronic crash sensor is provided, which is connected to the controller.

11. The liquid gas system of claim 1 wherein a crash signal interface is provided by means of which the liquid gas system is adapted to access the crash signal of vehicle-side crash sensor.

12. The liquid gas system of claim 1 wherein a heating element and a sensor are provided on the low-pressure side of the liquid gas system.

13. The liquid gas system of claim 12 wherein the sensor is a temperature sensor.

14. The liquid gas system of claim 13 wherein different cooling curves are stored in the controller and that the controller is adapted to compare a measured cooling curve with the stored cooling curves.

15. The liquid gas system of claim 1 wherein a filling level meter is provided.

16. The liquid gas system of claim 15 wherein the filling level meter is connected to the controller.

17. The liquid gas system of claim 1 wherein a heating device which is connected to the controller is provided at the gas pressure regulator.

18. The liquid gas system of claim 17 wherein a temperature sensor which is connected to the controller is associated with the heating device.

19. The liquid gas system of claim 1 wherein the filter unit comprises a near field communications interface.

20. The liquid gas system of claim 1 wherein the controller comprises a remote communications interface.

21. The liquid gas system of claim 1 wherein the remote gas switch is directly connected to the input of the gas pressure regulator.

22. The liquid gas system of claim 1 wherein the remote gas switch is connected to the input of the gas pressure regulator by means of a high-pressure tube.

23. The liquid gas system of claim 22 wherein the high-pressure tube contains a tube break protector.

* * * * *